United States Patent [19]

Yokota

[11] Patent Number: 5,141,147
[45] Date of Patent: Aug. 25, 1992

[54] REFLOW SOLDERING METHOD AND THE APPARATUS THEREOF

[75] Inventor: Yatsuharu Yokota, Hachioji, Japan
[73] Assignee: Eightic Tectron Co., Ltd., Japan
[21] Appl. No.: 707,901
[22] Filed: May 30, 1991

[30] Foreign Application Priority Data

May 31, 1990 [JP] Japan .................... 2-143938

[51] Int. Cl.$^5$ .................................. B23K 1/012
[52] U.S. Cl. ........................ 228/219; 228/222; 228/42; 219/399; 219/539; 432/233
[58] Field of Search ............ 228/219, 222, 102, 42, 228/46; 432/4, 77, 233; 219/539, 397, 399

[56] References Cited

U.S. PATENT DOCUMENTS

| 3,261,596 | 7/1966 | Bowman | 432/77 |
| 4,140,266 | 2/1979 | Wagner | 228/219 |
| 4,832,249 | 5/1989 | Ehler | 228/102 |
| 4,909,430 | 3/1990 | Yokota | 228/102 |

Primary Examiner—Samuel M. Heinrich
Attorney, Agent, or Firm—Finnegan, Henderson, Farabow, Garrett & Dunner

[57] ABSTRACT

A reflow soldering method and the apparatus thereof is described for soldering a base board having electronic elements located thereon by an inert gas circulated through heater means in a plurality of chambers while the base board is transported through all the chambers, the inert gas being circulated by ventilating means driven by drive means, the method and the apparatus thereof comprising a shield case for enclosing at least the chambers, the ventilating means and the drive means to shut off the same from an outer air and refrigerating means for cooling down the inert gas in the shield case.

5 Claims, 2 Drawing Sheets

REFLOW SOLDERING METHOD AND THE APPARATUS THEREOF

BACKGROUND OF THE INVENTION

The invention relates to a reflow soldering method and apparatus wherein a shield case is employed to enclose all ventilators and the drive parts thereof for circulating a heated inert gas such as a nitrogen gas to solder base boards having electronic elements located thereon so as to prevent ambient or outside air from coming into preliminary heating chambers and inert gas chambers in which the base boards are soldered, to thereby maintain a high purity of the inert gas for the purpose of attaining a desired soldering effects.

According to the conventional reflow soldering method and apparatus using an inert gas such as a nitrogen gas, which is heated and circulated in the inert gas chambers in which the base boards are soldered, outside or ambient air is easily enters the inert gas chambers through the drive parts, that is, through the clearances between the rotational shafts of motors and the bearings thereof and/or the clearances between the drive shafts of the ventilators and lowers the purity of the inert gas in the chambers. As a result, the cream solder is oxidized and a desired soldering effect can not be attained. In order to maintain the purity of the inert gas, it is required to continuously supply the inert gas from a gas tank. This is uneconomical indeed.

For the purpose of eliminating such defects, the inventor of the present invention disclosed an invention in Japanese patent application 1-141479, an arrangement wherein the bearing parts of the ventilators are enclosed by a chamber pressurized with the inert gas. The chamber is however depressurized as the inert gas is absorbed by the ventilators and therefore a considerable amount of inert gas is uneconomically consumed.

Further, the same inventor disclosed another invention in Japanese patent application 1-202238, wherein the bearing parts of the ventilators are each enclosed and the enclosures are in communication with a high pressure part of an inert gas chamber to pressurize the enclosures so that the outside air will not come into the enclosures. This has succeeded to some degree in reducing the uneconomical consumption of inert gas, but not completely succeeded in preventing the inert gas from leaking out of the enclosures.

It is therefore a primary object of the invention to eliminate the defects and disadvantages of the prior art and to provide a reflow soldering method and the apparatus, wherein a shield case is provided to enclose ventilators for circulating an inert gas in inert gas chambers, motors for driving the ventilators and having rotational shafts operatively connected to the ventilators and refrigerators for cooling down the inert gas, to thereby prevent the motors from overheating and further prevent outside orambient air from entering the inert gas chambers, thus to maintain the purity of the inert gas to attain a desired soldering effects. It is another object of the invention to circulate the inert gas through the refrigerators to repeatedly cool the same to thereby reduce the uneconomical consumption of inert gas and further to reduce the running cost of the apparatus. It is another object of the invention to cool down a soldered base board by the cooled inert gas to prevent the metal parts of the base board from being oxidized. It is still another object of the invention to reduce the noises of the motors by enclosing the same with the shield case.

SUMMARY OF THE INVENTION

In short, the present invention provides a reflow soldering method for circulating an inert gas through heater means by ventilating means in a plurality of chambers to thereby solder a base board having electronic elements located thereon while the base board is transported all through the chambers, the ventilating means being driven by drive means, said reflow soldering method comprising the steps of: enclosing at least said chambers, said ventilating means and said drive means by means of a shield case to shut off the same from ambient air; filling said shield case with said inert gas; and cooling said inert gas in said shield case.

Further the present invention provides a reflow soldering apparatus for soldering a base board having electronic elements located thereon by an inert gas circulated through heater means in a plurality of chambers while the base board is transported through all the chambers, the inert gas being circulated by ventilating means driven by drive means, said reflow soldering apparatus comprising a shield case for enclosing at least said chambers, said ventilating means and said drive means to shut off the same from an outside air; and refrigerating means for cooling down said inert gas in said shield case.

The other features and advantages of the invention will be apparent from the following description of a preferred embodiment in reference to attached drawings.

DETAILED DESCRIPTION OF THE INVENTION

Figure 1:
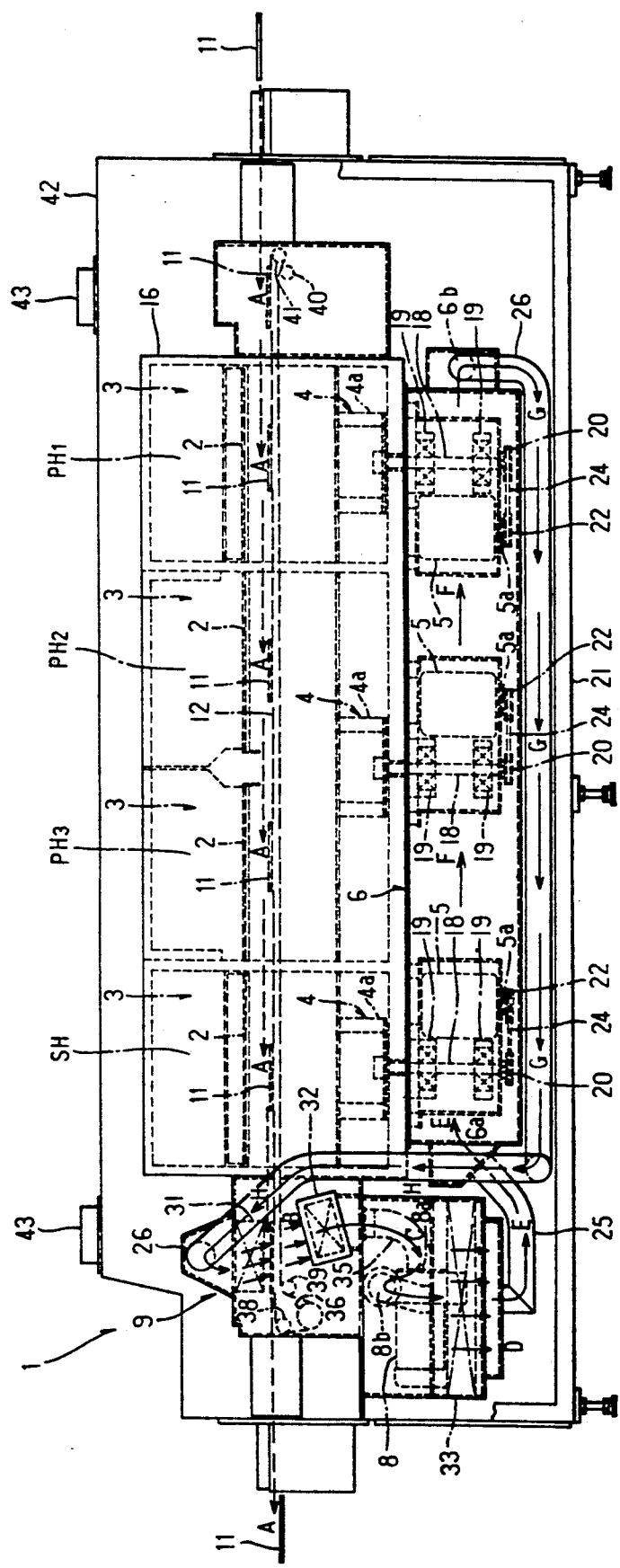
FIG. 1 is a front elevational view of a reflow soldering apparatus of the invention.
Figure 2:
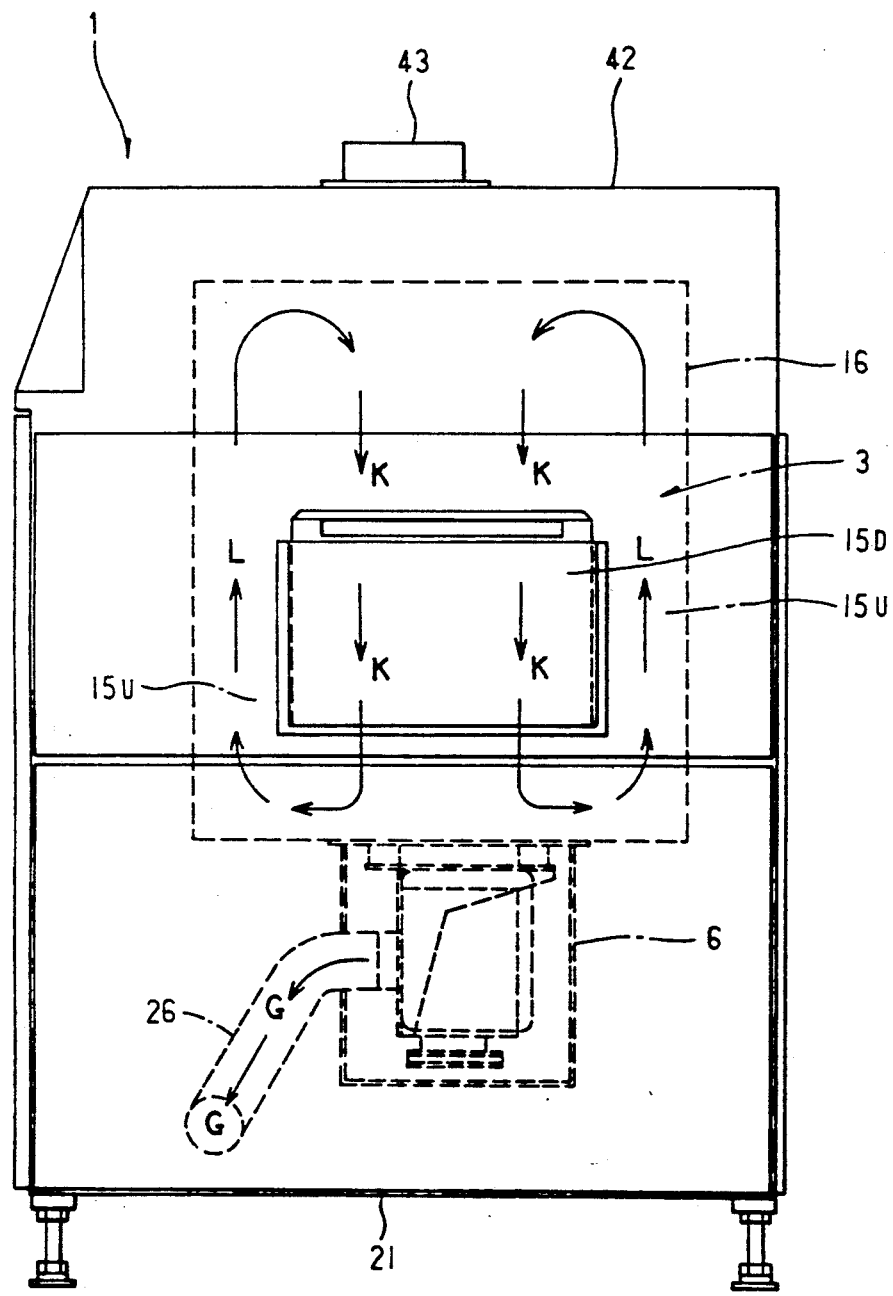
FIG. 2 is a right side elevational view of the reflow soldering apparatus.

In reference to FIGS. 1 and 2, the reflow-soldering apparatus 1 of the invention is provided with a plurality of heaters 2, a plurality of inert gas chambers 3, a plurality of ventilators 4, a plurality of electric motors 5, a shield case 6, a ventilator 8 and a refrigerating means 9.

The heaters 2 are used to heat an inert gas and are arranged above a conveyer 12 for transporting base boards 11 having electronic ports ( not shown ) mounted thereon. The heaters 2 are arranged in preliminary heating chambers PH1, PH2, PH3, and a reflow heating chamber SH respectively, and are hollow or perforated to heat the inert gas while the latter flows therethrough from above to below.

The inert gas chambers 3 are employed to circulate the inert gas therein for heating the base boards 11 transported into the chambers. Each of the inert gas chambers 3 is provided with a central channel 15 D and circulation channels 15 U as shown in FIG. 2. The central channel 15 D is provided to allow the inert gas to flow down therethrough while heating the base board 11 as the inert gas is sucked down through the heater 2 by the ventilator 4. The circulation channels 15 U are provided on both sides of the central channel 15 D so as to allow the down flowing inert gas to flow up therethrough to above the heater 2 as the inert gas is blowen around the outer periphery of the ventilator 4 and pressurized by the ventilator 4. Further the inert gas chambers 3 are enclosed and isolated from ambient atmosphere by a case 16 having a heat insulating material provided therewith.

The inert gas to be employed may include nitrogen gas, argon gas, carbon dioxide, etc. But nitrogen gas is preferable, which is contained in a tank and is available at a comparatively lower cost in the market.

Each of the ventilators 4 is provided to circulate the inert gas in each of the inert gas chambers 3. According to the illustrated, three ventilators are arranged in alignment below the shield case 6. One of the ventilators 4 is used for the preliminary heating chamber PH1, another one is used for the two preliminary heating chambers PH2, PH3 and the other is used for the reflow heating chamber SH. Each of the ventilators 4 has a sirocco fan 4a secured to an upper end of a drive shaft 18 thereof. The drive shaft 18 is rotatably journalled in each pair of vertically aligned bearings 19 secured to a base 21 and has a pulley 20 secured to a lower end thereof.

The electric motors 5 are provided to drive the three ventilators 4 respectively and are secured to the base 21. Each of the electric motors 5 has a rotational shaft 5a having a pulley 22 secured thereto which is connected to the pulley 20 by a belt 24 of the drive shaft 18 such that the ventilator 4 is driven by the electric motor 5.

The shield case 6 is provided to tightly enclose all parts for circulating the inert gas including the electric motors 5 having the rotational shafts 5a for driving the ventilators 4 and the inert gas chambers 3 to completely intercept these parts from the outer air. The shield case 6 is structured in a cubic form as shown with a material such as an easily radiatable iron plate and the like and tightly encloses the three electric motors 5, the bearings 19 and the drive shafts 18 as well. The case 6 has an inlet 6a formed on one end side thereof for introducing the inert gas thereinto through a pipe 25. The case 6 has an outlet 6b formed on the opposite end side thereof for recovering the inert gas through a pipe 26.

The shield case 6 is so structured as to prevent outside air from entering thereinto and accordingly to prevent an air containing much oxigen detracting the soldering effect from coming into the preliminary heating chambers PH1, PH2 and the reflow heating chamber SH through the clearances between the bearings 19 and the drive shafts 18 of the ventilators 4.

The ventilators 4, which are centrifugal ventilators, are employed to circulate the inert gas within the shield case 6 and further to circulate a cooled air within the shield case 6 to cool down the base boards 11 when the latter are soldered.

A refrigerator 9 is provided to cool down the inert gas in the shield case 6, and is composed of a compressor (not shown) for cooling the inert gas, a first radiator 31, a second radiator 32 and a third radiator 33, to which a cooling medium is supplied sequentially from the compressor. The first radiator 31 is arranged above the conveyer 12 at one end part thereof to which the base board 11 are transported after the base boards have been soldered. The first radiator 31 has one end of the pipe 26 connected thereto for recovering the inert gas from the outlet 6b at the opposite end side of the shield case 6, to which the opposite end of the pipe 26 is connected. The refrigerator 31 is designed to blow a cooled inert gas to the base board 11 to cool down the same to a predetermined temperature.

The second radiator 32 is arranged below the conveyer 12 and has one end of a pipe 35 connected thereto which has the other end connected to an inlet 8a of a ventilator 8. The radiator 32 is designed to cool down the inert gas which has been heated after having cooled down the base board 11 and then transport the cooled inert gas to the ventilator 8.

The third radiator 33 is provided to further cool down the inert gas, which is exhausted from the ventilator 8 and is not yet sufficiently cooled down, to a temperature for cooling down the three electric motors 5 which may otherwise be heated up. The third radiator 33 is communicated on one side thereof to an outlet 8b of the ventilator 8, and is communicated on the opposite side thereof to one end of the pipe 25 which has the other end connected to the inlet 6a of the shield case 6.

The base board transporting conveyer 12 is made of a net chain by way of example and is wound around a drive sprocket 36 and idle sprockets 38, 39 on one end thereof and is further wound around idle sprockets 40, 41 on the opposite end thereof as shown in FIG. 1. Thus the conveyer 12 is moved in the direction as indicated by an arrow A to thereby transport the base board 11 from one end thereof to the opposite end thereof.

A cover 42 is provided to entirely enclose the reflow soldering apparatus 1. The cover has two ventilating ducts 43 provided on the top thereof for ventilation thereof.

Thus the invention relates to a method for reflow soldering base boards, wherein an inert gas is heated up by heaters 2 and is circulated within inert gas chambers 3 to heat the base boards 11 having electronic elements mounted thereon, the method comprising the steps of tightly enclosing by a shield case 6 ventilators 4 for circulating the inert gas, electric motors 5 each having a rotational shaft 5a for driving the ventilators and inert gas chambers to isolate the inner part of the shield case from the outer air, filling the shield case with the inert gas and then cooling down the inert gas.

The apparatus of the invention is structured as mentioned abave, and the operation is as follows:

In case that the reflow soldering apparatus 1 is operated, the inert gas such as the nitrogen gas is employed. The inert gas may be contained in a tank ( not shown )and is generally available in the market. The inert gas is depressurized by a depressurization valve (not shown) and is supplied into the preliminary heating chambers PH1, PH2, PH3 and into the reflow heating chamber SH, and is also supplied to the refrigerator 9, to thereby fill the gas chambers 3 with the inert gas which replaces the air containing the oxygen.

When the ventilator 8 of the refrigerator 9 is driven, the inert gas is absorbed through the first radiator 31 in the direction as shown by arrow marks B and is cooled down in the first step. The inert gas passes through the conveyer 12 down into the second radiator 32 and is further cooled down in the second step. The inert gas is then absorbed into the pipe 35 as shown by arrow marks C and flows through the third radiator 33 and is further cooled in the third step. Thus the sufficiently cooled inert gas further flows down as shown by arrow marks D into the pipe 25 as shown by arrow marks E and into the shield case 6 and cools the electric motors 5 one after another as the inert gas flows in the direction as shown by arrow marks F.

The electric motors 5 are therefore prevented from overheating and can be driven for a long time with the heat depriving effect of the inert gas in the shield case 6 which shuts off the electric motors 5 from the outer air. Further the shield case 6 is filled with the inert gas and therefore the outside air is prevented from flowing into the shield case through the clearances between the drive shafts 18 and the bearings 5a, and therefore the loss of the inert gas and defective solderings may be prevented.

The inert gas, which has cooled the electric motors 5, has a temperature higher than the temperature as it had due to the heat it has absorbed from the driven motors 5, and enters the gas recovering pipe 26 and flows in the direction as shown by arrows G and H to the refrigerator 9 and then is returned into the first radiator 31 so as to be cooled down again.

With such preparation being set, the conveyer 12 is driven in the direction as shown by arrows A by rotating the sprocket 36. The base boards 11 having electronic elements located thereon to be soldered are placed on the conveyer 12 to be transported from right to left in FIG. 1. As shown in FIG. 2, the inert gas is heated up to a predetermined temperature in each of the inert gas chambers 3 by the heater 2 on the way as the inert gas comes down the central channel 15 D as shown by arrows K. The base board 11 is heated by the circulating inert gas up to a temperature of about 150° C. in the preliminary heating chambers PH1 and PH2. In the reflow heating chamber SH, the inert gas is heated up to about 250° C. for melting the cream solder on the base board 11 so that the reflow soldering is attained on the base board 11.

The inert gas, which has heated the base board 11, is absorbed and pressurized to come up as shown by arrows L in the circulation channels 15 U and heated again through the heater 2 as the gas comes down in the central channel 15 D. Thus the inert gas will repeatedly heat the base board 2.

According to the invention, the base board 11 is preheated and soldered by the reflowing inert gas as mentioned above. Since the outside air is prevented from coming into the inert gas chambers 3 through the driving parts of the ventilators 4, the inert gas chambers 3 are always filled with an inert gas of a high purity, preventing the cream solder on the base board 11 from being oxidized. Therefore a desired reflow soldering may be attained. Further since the inert gas, which is sufficiently cooled down by the refrigerator 9 and cools the electric motors 5, the motors will not be damaged by the heat which is produced while the motors are driven to drive the ventilators 4. Further since the driving parts including the motors 5 and drive shafts 19 are completely shielded by the shield case 6, the noise of the motors 5, which are especially problematical in the reflow soldering apparatus, are contained, and therefore may be extremely reduced.

The invention thus described, it will be obvious that the same may be varied in many ways. Such variations are not to be regarded as a departure from the spirit and scope of the invention, and all such modifications are intended to be included within the scope of the following claims.

What is claimed is:

1. A reflow soldering method for circulating an inert gas through heater means by ventilating means in a plurality of chambers to thereby solder a base board having electronic elements located thereon while the base board is transported through all the chambers, the ventilating means being driven by drive means, said reflow soldering method comprising the steps of: enclosing at least said chambers, said ventilating means and said drive means by means of a shield case to isolate same from ambient air; filling said shield case with said inert gas; and cooling said inert gas in said shield case.

2. The reflow soldering method as defined in claim 1, wherein said ventilating means comprises a plurality of ventilators, one of said ventilators being arranged in each of said chambers, and wherein said drive means comprises a plurality of motors each having a rotational shaft operatively connected to each of said ventilators, respectively.

3. A reflow soldering apparatus for soldering a base board having electronic elements located thereon by an inert gas circulated through heater means in a plurality of chambers while the base board is transported through all the chambers, the inert gas being circulated by ventilating means driven by drive means, said reflow soldering apparatus comprising a shield case for enclosing at least said chambers, said ventilating means and said drive means to isolate same from ambient air; and refrigerating means for cooling said inert gas in said shield case.

4. The reflow soldering apparatus as defined in claim 3, wherein said ventilating means comprises a plurality of ventilators, one of said ventilators being arranged in each of said chambers, and wherein said drive means comprises a plurality of motors each having a rotational shaft operatively connected to each of said ventilators, respectively.

5. The reflow soldering apparatus as defined in claim 3, wherein said refrigerating means comprises a plurality of radiators arranged such that said inert air flows through said radiators successively.

* * * * *